United States Patent [19]

Ledermann et al.

[11] Patent Number: 5,740,746
[45] Date of Patent: Apr. 21, 1998

[54] SEED MATERIAL DISPENSING SYSTEM FOR AN AGRICULTURAL PLANTER

[75] Inventors: Donald Lawrence Ledermann, Darien; John F. Stufflebeam, Romeoville, both of Ill.

[73] Assignee: Case Corporation, Racine, Wis.

[21] Appl. No.: 514,421

[22] Filed: Aug. 11, 1995

[51] Int. Cl.⁶ .............................. A01C 1/00; A01C 7/00
[52] U.S. Cl. ......................... 111/174; 221/211; 222/414; 239/654; 111/179
[58] Field of Search .................. 111/63, 74, 77, 111/177, 178, 179, 180, 174, 170; 221/209, 211; 239/654, 655; 222/279, 410, 414; 406/41

[56] References Cited

U.S. PATENT DOCUMENTS

| | | |
|---|---|---|
| 4,286,530 | 9/1981 | Conley . |
| 4,503,786 | 3/1985 | Tautfest .................... 222/279 X |
| 4,519,525 | 5/1985 | Wunschl et al. ............... 111/77 X |
| 4,569,486 | 2/1986 | Balmer ..................... 239/655 |
| 4,718,363 | 1/1988 | Williames .................. 111/77 X |
| 5,156,102 | 10/1992 | Andersen .................. 111/77 X |
| 5,161,473 | 11/1992 | Landphair et al. ............. 111/174 X |

OTHER PUBLICATIONS

400 Planter Revolution — five (5) pages from International Harvester catalog (date unknown).

*Primary Examiner*—Terry Lee Melius
*Assistant Examiner*—Christopher J. Novosad
*Attorney, Agent, or Firm*—Daniel J. Hulseberg; Mayer Brown & Platt

[57] ABSTRACT

A particulate matter or seed dispensing system for an agricultural implement having a mobile frame with a plurality of row units mounted to the frame. The seed dispensing system includes an upright storage hopper that is adapted to be carried by the frame and has the capacity for holding a large quantity of particulate matter such as seed. A bin is adapted to be carried on each row unit for holding a quantity of particulate matter or seed. Notably, each bin holds substantially less than the quantity of particulate matter adapted to be held in the storage hopper. A metering unit is adapted to be arranged on each row unit proximate a furrow opener of the row unit. The metering unit is arranged in material receiving relation relative to a respective bin on each row unit. The dispensing system of the present invention further includes an apparatus for delivering particulate matter from the hopper individually to each bin as a function of the quantity of particulate matter or seed material in the bins. A method of dispensing seed material from a planter, grain drill or the like is also disclosed.

20 Claims, 4 Drawing Sheets

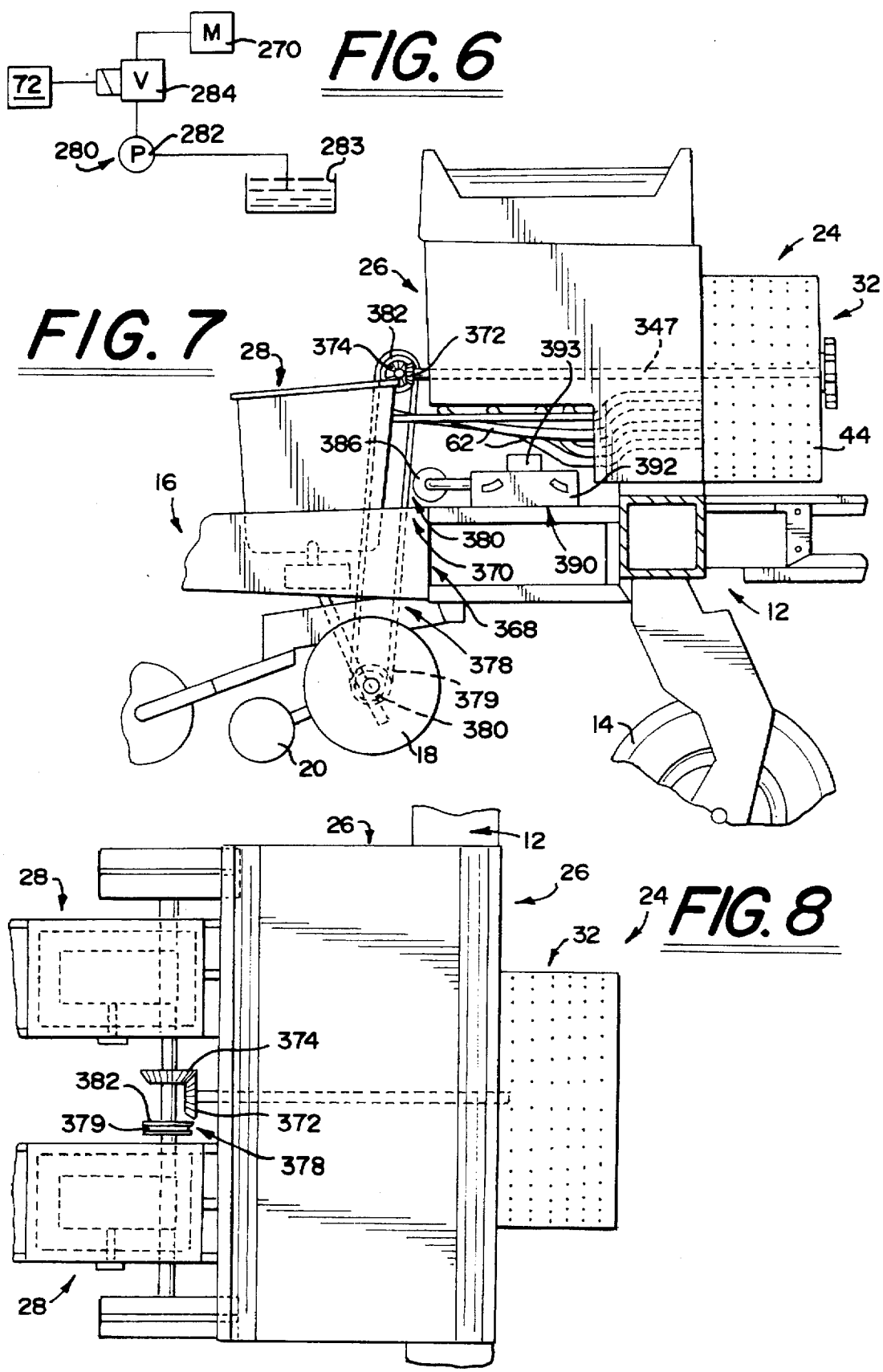

SEED MATERIAL DISPENSING SYSTEM FOR AN AGRICULTURAL PLANTER

FIELD OF THE INVENTION

The present invention generally relates to agricultural planters and, more particularly, to a seed or particulate material dispensing mechanism for planters, grain drills and the like.

BACKGROUND OF THE INVENTION

Agricultural planters and the like typically include a transversely elongated mobile frame that is typically pulled behind a tractor or the like. Such planters include a series or plurality of row units that are connected to the frame for dispensing seed or particulate matter to the ground as the implement moves thereover. In larger agricultural implements, as many as twenty-four or more row units may be connected to the frame. The spacing between adjacent row units varies depending upon the particular planting operation. Moreover, the amount and size of the material to be dispensed from the row units varies depending upon ground conditions, climate, crops desired, geographical location and etc.

In some planters, each row unit has an individual bin or hopper for holding the seed or particulate matter to be dispensed. Such a hopper includes a lid or cover that is latched in place during operation of the implement. The individual seed bins or hoppers on the row units are not very large and, thus, the operator is required to frequently stop the planting operation, often in the middle of the field, to refill the hopper or bins. As will be appreciated, time is usually of the essence during a planting operation.

In those instances where individual bags are used to refill the individual hoppers or bins on the row units, the operator needs to initially unlatch the lid on each individual hopper, rip open the seed bags, fall the hopper, and then relatch the lid. Because the distance between opposite end row units can span sixty feet or more, individually falling the hopper on each row unit can be a time consuming and exhaustive manual process. Moreover, and as will be appreciated, depending upon the filled condition of the hopper, the weight of the row unit can vary and, thus, a furrow opener arranged in combination with the row unit will operate at different depths during the planting operation depending on the fill level or quantity of particulate matter or seed in the hoppers.

In those instances where the hoppers are filled with replacement seed from a wagon or truck, only three or four hoppers can be filled before the operator needs to reposition the truck to fill the next three or four hoppers. Either refilling method is both time consuming, ineffective, and inconvenient.

It is also known to provide an agricultural implement with one, two or even three relatively large upright supply hoppers. In those implements with one, two or three supply hoppers, a pneumatic distribution system including a plurality of flexible conduits is required to direct metered quantities of seed from the hopper to each row unit. Many times, a seed or material metering assembly or device is located a substantial distance from a furrow opener on each row unit.

Thus, there remains a need and a desire for a seed dispensing system for an agricultural planter that provides for seed metering proximate to the row units and yet avoids having to continuously interrupt a planting operation to refill individual hopper units arranged on the implement.

SUMMARY OF THE INVENTION

In view of the above, and in accordance with the teachings of the present invention, there is provided a particulate matter or seed dispensing system for an agricultural implement having a mobile frame with a plurality of row units mounted to the frame. The seed dispensing system of the present invention includes an upright storage or supply hopper that is adapted to be carried by the frame and has the capacity for holding a large quantity of particulate matter such as seed. A bin is adapted to be carried on each row unit for holding a quantity of particulate matter or seed. Notably, each bin holds substantially less than the quantity of particulate matter adapted to be held in the storage hopper. To enhance accurate deposit of the particulate matter or seed to the ground as the implement is drawn thereacross, a metering apparatus is adapted to be arranged on each row unit proximate to and above a furrow opener on the row unit. The metering apparatus is arranged in material receiving relation relative to a respective small bin on each row unit. To substantially reduce the amount of time required to fill each bin on the row unit and, thus, enhance operation of the implement, the present invention further includes an apparatus for delivering particulate matter from the relatively large supply hopper individually to each relatively small bin as a function of the quantity of particulate matter or seed material in the bins.

In a preferred form of the invention, the delivery apparatus is pneumatically operated. More specifically, the delivery apparatus preferably includes a plurality of pneumatic passages or conduits leading from the main storage hopper to each bin or auxiliary hopper on the row units for pneumatically directing air in a single direction whereby forcibly moving particulate matter or seed between the hopper and the bins on the row units.

In a most preferred form of the invention, the delivery apparatus includes a drum arranged in matter receiving relation relative to and mounted for rotation about a fixed axis of rotation. A drive mechanism is provided for rotating the drum about the drive axis. The drum defines plural rows of evenly spaced seed retaining pockets with holes or air pervious openings circumferentially arranged about the drum for releasably holding particulate matter under the influence of differential air pressure. A pressurized source of air directs pressurized air into an interior of the drum. Moreover, a distributor is arranged in combination with and for receiving particulate matter or seed in metered quantities from the drum and directs the same through pneumatic passages to refill the bin on each row unit.

The distributor includes a manifold defining a series of openings arranged in general alignment with the plural rows or retaining holes on the drum. The distributor directs particulate matter from the drum to a plurality of conduits leading from the series of openings and, thence, to the bins on the row units. In a most preferred form of the invention, a separator apparatus is arranged in combination with the drum for closing the holes on the drum at a preselected position about the axis of rotation of the drum such that the particulate matter or seed carried by the drum falls by gravity into the series of openings defined in the distributor manifold.

The drive mechanism of the delivery apparatus preferably operates at various speeds for controlling the supply of particulate matter or seeds from the main hopper to the individual bins on the row units. In a preferred form of the invention, a motor is used to rotatably drive the drum of the delivery apparatus in a manner intermittently supplying particulate matter to refill the bins on the row units. Alternatively, the drum of the delivery apparatus could be driven from a ground engaging wheel on the agricultural implement. Because particulate matter or seed will be discharged from each bin in substantially constant amounts, it is preferable to use a single apparatus for monitoring quantity of particulate matter in a bin in a manner controlling rotation of the drum and thereby the delivery of particulate matter from the main hopper to each of the bins.

The present invention furthermore discloses a method for dispensing seed material from a planter having a mobile frame with a plurality of planter units monitored therein. The enhanced method of the present invention comprises the steps of holding a large quantity of seed material in a relatively large seed or supply hopper carried on the frame; holding a smaller quantity of seed material in relatively small seed bins, with one seed bin being mounted on each planter row unit and wherein the quantity of seed held in the bin is substantially less than the quantity of seeds adapted to be held in the hopper. The enhanced method further includes the steps of metering the flow of seed material from each bin; and delivering the seed material from the hopper individually to each bin as a function of the quantity of seed material in at least one of said bins.

The seed distribution system of the present invention is relatively inexpensive and provides a metered discharge of matter proximate to the furrow opener on each row unit thus enhancing the precision of the planting operation. Automatically dispensing matter from the main hopper to the smaller bins reduces the downtime normally associated with refilling of the smaller hoppers and, thus, enhances the planting operation when time is of a paramount concern.

These and other numerous objects, features and advantages of the present invention will become readily apparent to one skilled in the art upon reading the following detailed description, the appended claims, and the drawings.

BRIEF DESCRIPTION OF THE DRAWINGS

FIG. 6 is a schematic diagram of hydraulic circuitry associated with the drive mechanism schematically illustrated in FIG. 5;

FIG. 7 is a schematic representation of an another embodiment of a drive mechanism forming part of the dispensing system of the present invention; and FIG. 8 is a fragmentary plan view of the drive mechanism schematically illustrated in FIG. 7.

DESCRIPTION OF THE PRESENT INVENTION

Figure 1:
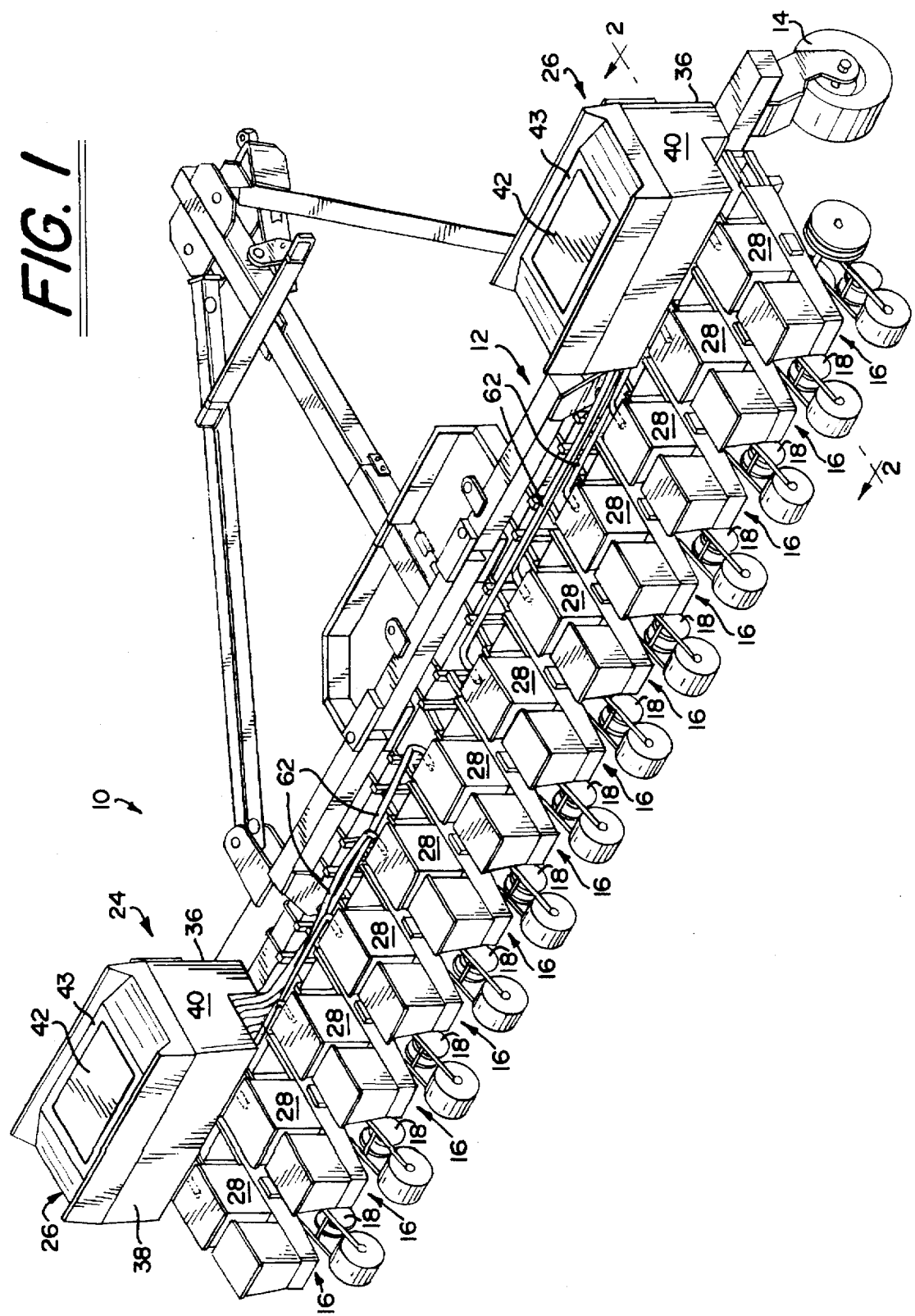
FIG. 1 is a perspective view of an agricultural implement for connection to a tractor and having mounted thereon a seed material dispensing system incorporated features of the present invention.

While the present invention is susceptible of embodiment in various forms, there is shown in the drawings and will hereinafter be described preferred embodiments of the invention with the understanding that the present disclosure is to be considered as setting forth exemplifications of the invention which are not intended to limit the invention to the specific embodiments illustrated.

Referring now the drawings, wherein like reference numerals refer to like parts through the several views, there is shown in FIG. 1 an agricultural implement 10 such as a planter or the like which distributes particulate matter, such as seed, onto the ground as the implement 10 is drawn across a field. The planter 10 includes a transversely elongated mobile frame 12 which is supported by wheels 14. The frame 12 is adapted to be coupled to a hitch assembly (not shown) and is pulled across a field behind a suitable off-highway tractor or the like (not shown). The illustrated planter 10 includes a plurality of row units 16, at transversely spaced apart locations on the frame 12. It should be appreciated, however, that the present invention is equally applicable to other types of planters as well as grain drills and the like. Each row unit 16 typically includes a furrow opener 18 that produces a furrow in the ground and into which seeds are to be individually deposited with precise spacing relative to each other. Press wheels 20 trail the furrow opener in the usual manner of planter operation.

Figure 2:
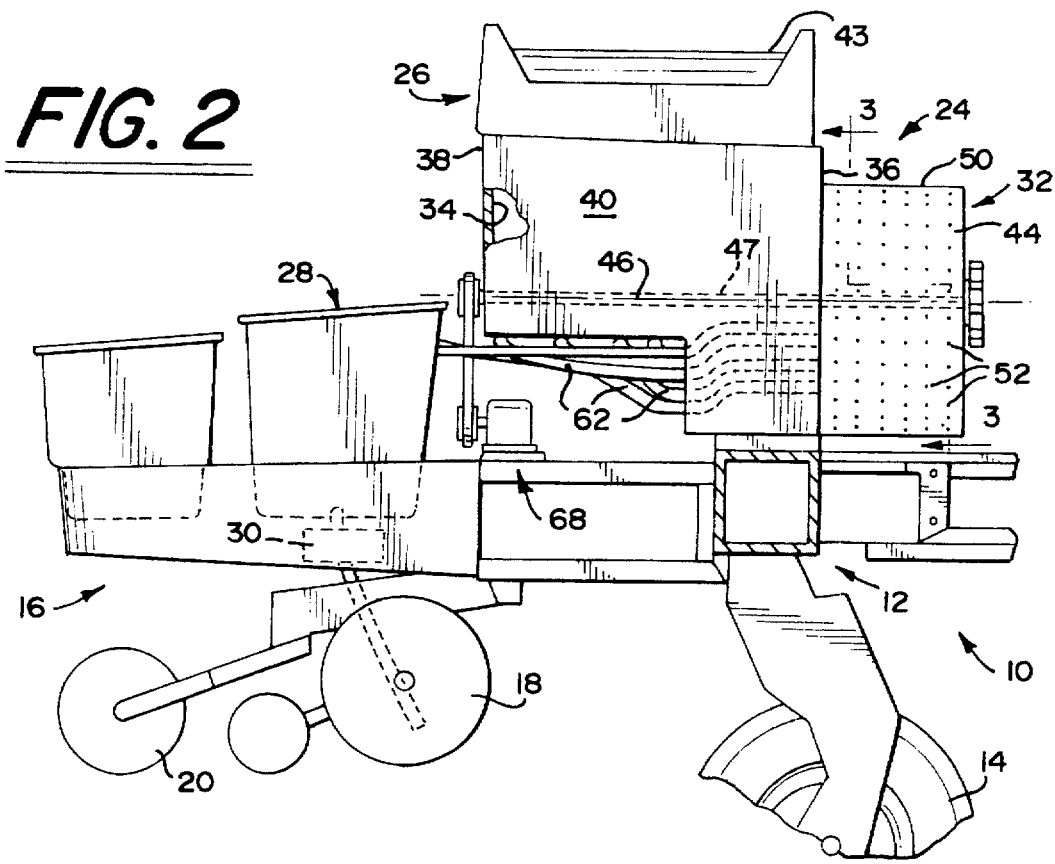
FIG. 2 is a side elevational view of the dispensing system shown in FIG. 1.

According to the present invention, a seed dispensing system 24 is arranged for use with the planter 10. As shown in FIGS. 1 and 2, the dispensing system 24 of the present invention includes a main seed material storage unit or supply hopper 26 that is adapted to be supported on the frame 12 of the planter 10. The dispensing system 24 of the present invention further includes a plurality of auxiliary seed material storage units or bins 28, with one bin 28 being adapted to be carried by each row unit 16. A conventional seed metering unit 30 is arranged in seed material receiving relation with each bin 28 for controlling the discharge of particulate matter or seed proximate to the furrow opener 18 of each row unit 16 to promote accurate spacing and planting of the seeds. A delivery apparatus 32 extends between the hopper 26 and each bin 28 for intermittently delivering particulate matter from the hopper 26 to refill the bins 28 thereby allowing continued operation of the planter 10.

The main seed material storage unit or hopper 26 defines an upright relatively large and enclosed seed storage area 34 (FIG. 2) capable of holding a relatively large quantity or particulate matter or seed therein. In the illustrated embodiment, the hopper 26 includes front and rear generally parallel and planar walls 36 and 38 extending upwardly from a bottom (not shown) and that are joined by generally parallel side walls 40 to define the enclosed storage area 34. In the illustrated embodiment, a cover or lid 42 (FIG. 1) closes an opening (not shown) defined by a top 43 of the hopper 26. As will be appreciated by those skilled in the art, the hopper 26 is replenished with particulate matter or seed through the opening in the top wall 43 of the hopper 26.

In the illustrated embodiment of the invention, the delivery apparatus 32 further includes an open sided seed distributor drum 44 that is mounted for rotation about a fixed axis 46. In the illustrated embodiment, the fixed axis 46 of rotation of the drum 44 is defined by an elongated drive shaft 47 suitably mounted for rotation and that axially extends away from the drum 44. As shown, drum 44 extends outwardly from and is rotatably sealed relative to wall 36 of hopper 26. The open side of drum 44 is disposed in seed material receiving relation with the hopper 26. A pressurized source of air 48 (FIG. 3) supplies air under pressure to an interior of drum 44.

Figure 3:
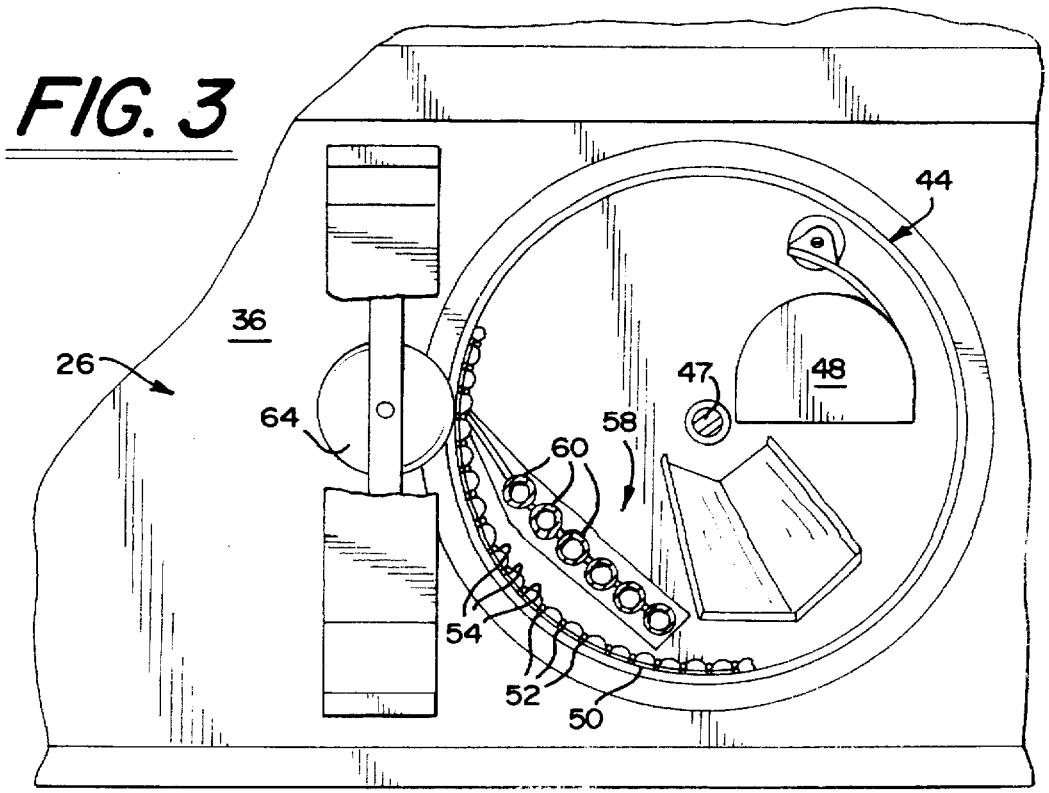
FIG. 3 is a partial sectional view taken along line 3—3 of FIG. 2.

As shown in FIGS. 2 and 3, drum 44 includes a peripheral portion 50 defining a plurality of longitudinally spaced circular rows of evenly spaced air pervious openings 52. On the interior of the drum 44, a depression or pocket 54 is formed about each opening 52 such that one or more seeds are retained about the interior of the drum 44 under the influence of differential air pressure acting thereon as the drum 44 rotates about axis 46.

To deliver the seeds from hopper 26, a seed distribution manifold 58 receives seed material from the drum 44 and delivers the particulate matter or seed material to refill the bins 28. As is known in the art, manifold 58 includes a plurality of manifold branches 60 each having an open end arranged in general alignment with a circular row of openings 52 on drum 44 for individually directing particulate matter from the plural rows of retaining holes or openings 52 on drum 44. At their opposite ends, each manifold branch 60 has a conduit 62 (FIG. 2) connected thereto for defining a closed passage leading from hopper 26 to the individual bins 28. The conduits 62 are preferably configured as elongated tubes having different lengths.

In operation, particulate matter or seed material from the hopper 26 passes into the drum 44 to form a supply or seed mass in the bottom thereof. One or more seeds from the seed mass deposited in drum 44 are held against the openings 52 and within the depressions or pockets 54 by the pressure differential between the external atmospheric air and the high pressure air introduced into the drum 44. The drum 44 is drivingly rotated about axis 46 by a suitable drive mechanism 68. As the drum 44 rotates, it carries the captured particulate matter or seeds with it toward the open tops of the manifold branches 60 where a series of external rollers 64 pass over the openings 52. As the openings 52 move into engagement with the rollers 64, the pressure differential between the inside and the outside of the seed openings 52 is negated and the particulate matter or seeds are released from the respective depression or pocket 54. At this time, the seeds are disposed directly above the manifold branches 60 so that the seeds fall by gravity and through the respective manifold branches 60.

The particulate matter is propelled through the manifold branches 60 and their respective outlet conduits 62 at a metered flow rate. The metered flow rate of the delivery system 32 of the present invention is effected through controlled rotation of the drum 44 as by the drive mechanism 68. Air pressure from the drum 44 likewise flows through the conduits 62 and carries the released seeds along with it thereby pneumatically delivering the seed materials to refill the bins 28.

Figure 4:
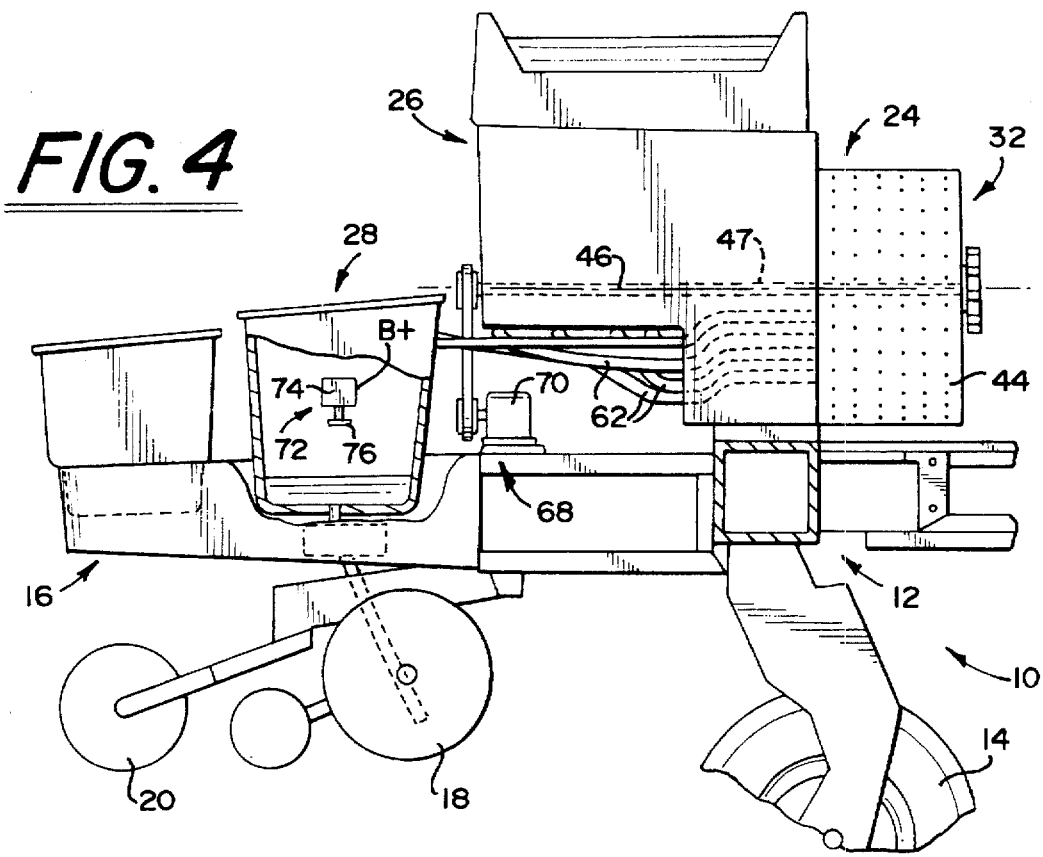
FIG. 4 is a schematic side elevational view, partially in section, of a drive mechanism forming part of the seed material dispensing system of the present invention.

The drive mechanism 68 of the delivery apparatus 32 is controlled by a sensing apparatus 72. As shown in FIG. 4, sensing apparatus 72 monitors the quantity of material in one of the bins 28 and controls operation of the drive mechanism 68 as a function thereof. As will be appreciated, since each of the row units 16 distributes substantially equal amounts of particulate matter or seed to the ground as the implement 10 is drawn thereover, the materials in the bins 28 will be depleted at substantially constant levels. Accordingly, only one sensing apparatus is required for monitoring the level in one of the bins 28 since the quantity or level of material in the other bins 28 should substantially correspond thereto.

In one embodiment, shown in FIG. 4, the drive mechanism 68 includes a motor 70. In this form of the invention, motor 70 is suitably carried on the frame 12 of the implement 10 for rotatably driving the drive shaft 47 thus imparting rotation to the drum 44 about axis 46 at various speeds. In the embodiment illustrated in FIG. 4, motor 70 is an electrically driven motor. The sensing apparatus 72 preferably comprises a sensor 74 that is connected to a suitable power source B+ such as a battery on the tractor. In the embodiment illustrated in FIG. 4, sensor 74 is a conventional electro/mechanical mechanism including a movable arm 76 that responds to the quantity of particulate matter in the bin 28. As will be appreciated, the sensor 74 serves as a switch between the power source B+ and motor 70.

Figure 5:
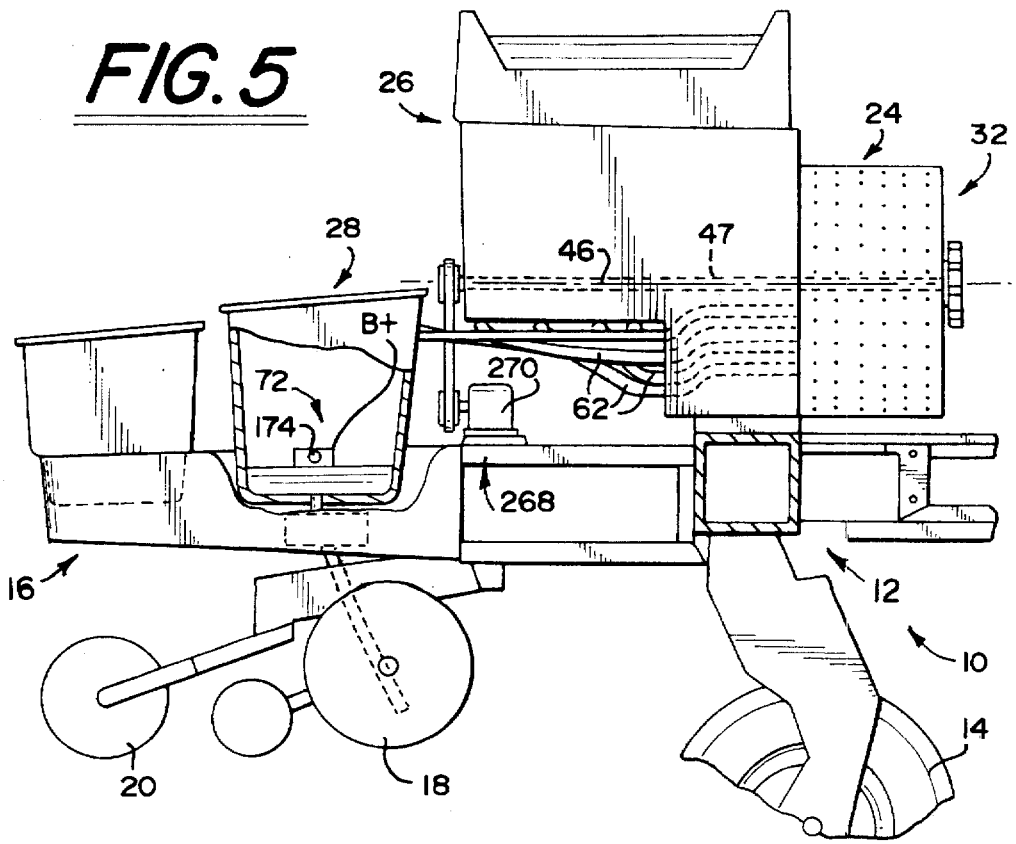
FIG. 5 is a schematic side elevational view, partially in section, of another embodiment of a drive mechanism forming part of the dispensing system of the present invention.

In an alternative embodiment, and is shown in FIG. 5, the sensing apparatus 72 includes a conventional optical sensor 174 for monitoring the quantity of particulate matter in bin 28. As with sensor 74, the purpose of the optical sensor 174 is to monitor the quantity of particulate matter or seed in one of the bins 28 and, accordingly, control the motor 70 (FIG. 4) and, thus, control the delivery of particulate matter or seed from the hopper 26 to the individual bins 28 as a function of the signal received from the optical sensor 174.

In an alternative embodiment of the invention also illustrated in FIG. 5, a hydraulically operated drive mechanism 268 can be substituted for the electrically operated drive mechanism illustrated in FIG. 4 without detracting or departing from the spirit and scope of the present invention. With the hydraulically operated drive mechanism 268, driving power for rotating the drive shaft 47 and thus the drum 44 of the distributing apparatus 32 is derived from a hydraulically driven motor 270. The hydraulically driven motor 270 is connected to and is operated by the sensing apparatus 72 described above and which can take the form of either an electro/mechanical or optical sensor. Other suitable sensors are well known and are likewise intended to be within the spirit and scope of the present invention.

In this alternative embodiment of the drive mechanism, and as schematically illustrated in FIG. 6, the motor 270 is connected to a hydraulic power source 280 such as a pump 282 arranged in combination with a suitable reservoir or sump 283. A solenoid actuated valve 284 is disposed between pump 282 and controls the motor 270. The position of valve 284 and, thus, the operation of the delivery apparatus 32 (FIG. 4) of the dispensing system is controlled by the sensing apparatus 72.

Another alternative form of drive mechanism for the delivery apparatus 32 is schematically illustrated in FIGS. 7 and 8o As shown, (FIG. 2) the drive mechanism for the delivery apparatus 32 could be configured as a clutch operated mechanism 370 including a driven member or gear 372 mounted on and attached to a drive shaft 347 axially extending from and connected to the drum 44, a drive member or gear 374 that is rotatably driven by a ground engaging member of the agricultural implement 10 such as a press wheel 20 or other suitable ground engaging member, and a suitable force transfer mechanism 378. In the illustrated embodiment, the force transfer mechanism 378 comprises a belt or chain 379 that is entrained about a drive member 380 that rotates with the ground engaging member 18 and a drive member 382 that rotates with and provides rotational power to the driven member or gear 374.

Transmission of power between the drive and driven members 380 and 382, respectively, to effect rotation of the drum 44, thus, effecting controlled delivery of particulate matter or seed from the hopper 26 to the individual bins 28, is achieved through a selectively operated clutch 380. Clutch 380 includes an idler roller 386. As will be appreciated by those skilled in the art, the idler roller 386 is carried adjacent to the force transfer mechanism 378 or belt for movement between a clutch-engaged position and a clutch-disengaged position., The clutch operated drive mechanism 368 is preferably operated under the influence of an actuator 390 such as a linearly distendable/retractable cylinder 392. One end of the cylinder 392 is suitably connected to the implement frame 12 or a respective row unit 16 while the opposite end of the cylinder 392 mounts and has connected thereto the idler roller 386. The cylinder 392 is preferably configured as a double acting cylinder that operates under the influence of a valve 393. As will be appreciated, a single acting cylinder having a spring return will equally suffice.

During operation of the implement, the sensing assembly 72, which may be of either type described above or alternative forms thereof, monitors the quantity of seed material in at least one bin or auxiliary hopper 28 and controls the clutch operated drive mechanism 368 accordingly. As will be appreciated, extension of the driver or actuator 392 causes the idler roller 386 to engage and remove slack from the drive belt 378 with a result that the belt 378 is conditioned to transfer motion from the drive member 380 to the driven member 382 and, in the preferred embodiment of the invention, thence to the drive shaft 347 thereby rotating the drum 44 to effect the delivery and, thus, refilling of the bins 28 from the hopper 26. When the actuator or cylinder 392 is moved to a retracted position, the idler roller 386 is ineffective to tension the belt 378 and, thus, no transfer of force is effected between the drive and driven members 380, 382, respectively, of the drive mechanism 368. Accordingly, the drum 44 is not rotated.

During operation of the implement 10, each row unit 16 dispenses particulate matter from the bin 28 to the ground through the respective metering apparatus or unit 30 associated with the respective row unit. Because the metering unit 30 is disposed closely adjacent to the opener 18 on each row unit 16, the delivery of particulate matter to the ground is not effected by the length of the conduits or tubes 62 leading from the hopper 26 to the bins 28 thus enhancing seed placement as the implement moves across the field.

As the implement moves across the field, the level or quantity of particulate matter or seed material in the bins 28 diminishes. The seed material dispensing system of the present invention, however, serves to automatically replenish the bins 28 with seed or particulate matter from the hopper 26 thus allowing continuous operation of the implement. Particulate matter is delivered from the hopper 26 individually to the bins 28 as a function of the quantity of particulate matter in at least one of the bins. As the particulate matter reaches a preselected level in the bins 28, the drive mechanism operates the delivery apparatus 32 in a single direction thereby directing replenishing seed or particulate matter to the bins 28. That is, with the present invention air flows through the tubes or delivery conduits 32 is in a single direction extending away from the drum 44 and toward the bins 28. As will be appreciated by those skilled in the art, the uneven length of the tubes 32 between hopper 26 and each of the bins 28 advantageously has no adverse effect on seed placement since the seed metering unit 30 is arranged proximate to the opener 18 on each row unit 16. Seed delivery from the hopper 26 to the bins 28 continues until the quantity of particulate matter in the bins 28 reaches a preselected level.

From the foregoing, it will be observed that numerous modifications and variations can be effected without departing from the true spirit and scope of the novel concept of the present invention. It will be appreciated that the present disclosure is intended to set forth exemplification of the invention, and is not intended to limit the invention to the specific embodiments illustrated. The disclosure is intended to cover by the appended claims all such modifications as fall within the scope of the claims.

What is claimed is:

1. A seed material dispensing system for a planter having a mobile frame with a plurality of row units mounted on the frame, said dispensing system comprising:

a main seed material storage unit adapted to be supported on said frame for holding a mass of seed material;

an auxiliary seed material storage unit adapted to be mounted on each of said row units for holding a mass quantity of seed material substantially less than the mass quantity of seed material adapted to be held within said main seed material storage unit;

a seed metering unit adapted to be arranged in seed material receiving relation with each auxiliary seed material storage unit to control the discharge of seed material therefrom;

a delivery system extending between said main seed material storage unit and each auxiliary seed material storage unit to intermittently deliver seed material to each auxiliary seed material storage unit from said main seed material storage unit at a predetermined and controlled rate; and a sensing apparatus to control operation of said delivery system as a function of the of seed material held in at least one of said auxiliary seed material storage units.

2. The seed material dispensing system according to claim 1 wherein said seed delivery system is pneumatically operated and includes a conduit leading from the main seed material storage unit to each of said auxiliary seed material storage units for delivering seed material therebetween.

3. A seed material dispensing system for a planter having a mobile frame with a plurality row units mounted on the frame, said dispensing system comprising;

a main seed material storage unit adapted to be supported on said frame for holding a mass quantity of seed material;

an auxiliary seed material storage unit adapted to be mounted on each of said row units for holding a mass quantity of seed material substantially less than the mass quantity of seed material adapted to be held within said main seed material storage unit;

a seed metering unit adapted to be arranged in seed material receiving relation with each auxiliary seed material storage unit to control the discharge of seed material therefrom:

a delivery system extending between said main seed material storage unit and each auxiliary seed material storage unit to intermittently deliver seed material to each auxiliary seed material storage unit from said main seed material storage unit, wherein said delivery system includes an open sided seed distributor drum mounted for driven rotation about a fixed axis of rotation, the open side being disposed in seed material receiving relation relative to said main seed material storage unit, a pressurized source of air to supply air under pressure to an interior of said drum, said drum defining a plurality of evenly spaced rows of seed-retaining holes about the circumference thereof and which releasably hold seed material to the drum under the influence of differential air pressure thereon, and a seed distribution manifold to receive seed material from said drum for delivery to said auxiliary seed material storage units; and a sensing apparatus to control operation of said delivery system as a function of the quantity of seed material held in at least one of said auxiliary seed material storage units.

4. The seed material dispensing system according to claim 3 wherein said delivery system further includes a motor to drive said drum about said axis.

5. The seed dispensing system according to claim 4 wherein said sensing apparatus comprises an electro/mechanical apparatus to sense the quantity of seed material in at least one of said auxiliary seed material storage units and to control operation of said motor as a function thereof.

6. The seed dispensing system according to claim 4 wherein said sensing apparatus comprises an optical apparatus to sense the quantity of seed material in at least one of said auxiliary seed material storage units and to control operation of said motor as a function thereof.

7. A particulate matter dispensing system for an agricultural implement having a mobile frame with a plurality of row units mounted on the frame, said dispensing system comprising:
   an upright hopper adapted to be carried by said frame for holding a large quantity of particulate matter;
   a plurality of bins, with one bin being adapted to be carried on each row unit for holding a quantity of particulate matter substantially less than the quantity of particulate matter adapted to be held by said hopper;
   a metering apparatus arranged in matter receiving relation with each bin to control the discharge of particulate matter from the respective bin; and
   an apparatus operable in a singular direction for delivering particulate matter from said hopper individually to said bins as a function of the quantity of particulate matter in at least one of said bins, wherein said apparatus for delivering particulate matter includes a drum arranged in matter receiving relation relative to and mounted for rotation about a fixed axis of rotation, a drive mechanism to rotate said drum about said axis, and wherein said drum defines plural rows of evenly spaced seed retaining holes circumferentially arranged thereabout to releasably hold particulate matter under the influence of differential air pressure to an interior of said drum, a pressurized source of air to direct pressurized air to the interior of said drum, and a distributor arranged in combination with and to receive particulate matter in metered quantities from said drum to direct said particulate matter in pneumatic passages to refill said bins.

8. The particulate matter dispensing system according to claim 7 wherein said distributor includes a manifold to individually direct particulate matter from the plural rows of holes on said drum to a plurality of conduits leading from said series of openings and to said bins.

9. The particulate matter dispensing system according to claim 7 wherein said drive mechanism for rotating said drum includes a motor to rotatably drive said drum about said fixed axis.

10. The particulate matter dispensing system according to claim 7 wherein said delivery apparatus further includes an apparatus to sense the quantity of particulate matter in one of said bins and to control said drive mechanism as a function thereof to regulate the rotational speed of the drum and thereby. refill the bins with particulate matter.

11. The particulate matter dispensing system according to claim 10 wherein said sensing apparatus comprises an electro/mechanical assembly arranged within one of said bins and operably associated with said drive mechanism to control the rotational speed of the drum.

12. The particulate matter dispensing system according to claim 10 wherein said sensing apparatus comprises an optical assembly arranged on one of said bins and operably associated with said drive mechanism to control the rotational speed of the drum.

13. A seed planter including a mobile frame adapted to be pulled across and over a field with a plurality of planter row units mounted to said frame, said seed planter further including a seed dispensing mechanism comprising an upright hopper carried on said frame for holding a large quantity of seeds, a plurality of seed bins for holding a quantity of seeds therein substantially less than the quantity of seed adapted to be held by said hopper, with one seed bin being carried by each row unit, a metering unit being arranged in combination with each seed bin to control the discharge of seeds at a location proximate to the ground as the planter is pulled across the field, and an apparatus to deliver seeds from said hopper individually to each of said bins at a predetermined and controlled rate and as a function of the quantity of seeds in at least one of said bins, wherein said delivery apparatus includes a drum arranged in matter receiving relation relative to and mounted for rotation about a fixed axis of rotation, a drive mechanism to rotate said drum about said axis, and wherein said drum defines plural rows of evenly spaced seed retaining holes circumferentially arranged thereabout to releasably hold particulate matter under the influence of differential air pressure to an interior of said drum, a pressurized source of air for directing pressurized air to the interior of said drum, and a distributor arranged in combination with and to receive particulate material in metered quantities from said drum and to direct said particulate material in pneumatic passages to refill said bins.

14. The seed planter according to claim 13 wherein said distributor includes a manifold to individually direct particulate matter from the plural rows of holes on said drum to a plurality of conduits leading from said series of openings and to said bins.

15. The seed planter according to claim 13 wherein said drive mechanism for rotating said drum includes a motor to rotatably drive said drum about said fixed axis.

16. The seed planter according to claim 13 wherein said delivery apparatus further includes an apparatus to sense the quantity of particulate matter in one of said bins and to control said drive mechanism as a function thereof to regulate the rotational speed of the drum and thereby refill the bins with particulate matter.

17. The seed planter according to claim 16 wherein said sensing apparatus comprises an electro/mechanical assembly arranged within one of said bins and operably associated with said drive mechanism to control the rotational speed of the drum.

18. The seed planter according to claim 16 wherein said sensing apparatus comprises an optical assembly arranged on one of said bins and operably associated with said drive mechanism to control the rotational speed of the drum.

19. A seed planter including a mobile frame adapted to be pulled across and over a field with a plurality of planter row units mounted to said frame, said seed planter further including a seed dispensing system comprising an upright hopper carried on said frame for holding a large quantity of seeds, a plurality of seed bins for holding a quantity of seeds therein substantially less than the quantity of seeds adapted to be held by said hopper, with one seed bin being carried by each row unit, a metering unit arranged in combination with each seed bin to control the discharge of seeds at a location proximate to the ground as the planter is pulled across the field, and an apparatus to deliver seeds from said hopper individually to each of said bins as a function of the quantity of seeds in at least one of said bins, and wherein said delivery apparatus comprises a drum arranged in seed receiving relation relative to said hopper, said drum being mounted for rotation about a generally horizontal axis, a drive mechanism to rotate said drum about said axis, and wherein said drum comprises a peripheral portion defining a plurality of longitudinally spaced circular rows of evenly spaced air previous openings which, upon rotation of the drum, receive seeds which are releasably held to the drum under the influence of differential air pressure acting thereon, an air supply source to provide pressurized air to an interior of said drum, and a seed distributor manifold arranged to receive seeds released from the drum and to direct the released seeds to the bins to replenish those seeds dispensed to the ground as the planter moves across the field.

20. The seed planter according to claim 19 wherein said delivery system further includes a separator apparatus arranged exterior to and adjacent the drum to close said air impervious holes at a preselected position about the rotation of said drum so as to effect the deposit of said seed into said distributor manifold.

* * * * *